United States Patent [19]

Kress et al.

[11] Patent Number: 5,196,747
[45] Date of Patent: Mar. 23, 1993

[54] UNIVERSAL ELECTRIC MOTOR

[75] Inventors: Willy Kress; Alfred Binder, both of Bisingen, Fed. Rep. of Germany

[73] Assignee: Kress-Elektrik GmbH & Co., Elektromotoren Fabrik, Bisingen, Fed. Rep. of Germany

[21] Appl. No.: 551,510

[22] Filed: Jul. 11, 1990

[30] Foreign Application Priority Data

Jul. 15, 1989 [DE] Fed. Rep. of Germany ....... 3923421

[51] Int. Cl.⁵ .............................................. H02K 5/00
[52] U.S. Cl. ........................................ 310/89; 310/42; 310/62; 310/68 A; 310/71; 310/72; 310/158; 318/244; 318/538
[58] Field of Search ...................... 310/158, 50, 89, 90, 310/62, 63, 43, 68 A, 68 B, 71, 72, 47, 229, 230, 239, 241, 242, 68 E, 228, 91, 254, 42, 258, 179, 248, 58; 318/244, 538, 541, 491; 388/937

[56] References Cited

U.S. PATENT DOCUMENTS

| | | | |
|---|---|---|---|
| 2,845,551 | 7/1958 | Potter | 310/87 |
| 3,369,136 | 2/1968 | Sanger | 310/87 |
| 3,440,465 | 4/1969 | Pratt | 310/50 |
| 3,462,623 | 8/1969 | Batson | 310/50 |
| 3,610,975 | 10/1971 | Onjanow | 310/63 |
| 3,699,366 | 10/1972 | Wood | 310/50 |
| 3,703,646 | 11/1972 | Jacyno | 310/47 |
| 3,829,722 | 8/1974 | Rosenthal, Jr. | 310/50 |
| 4,340,831 | 7/1982 | Kuhlmann | 310/68 R |
| 4,572,979 | 2/1986 | Haar | 310/71 |
| 4,613,781 | 9/1986 | Sanders | 310/239 |
| 4,748,353 | 5/1988 | Klingenstein | 310/50 |
| 4,763,031 | 8/1988 | Wang | 310/62 |
| 4,900,966 | 2/1990 | Winter | 310/239 |
| 4,978,877 | 12/1990 | Quirijnen | 310/239 |

FOREIGN PATENT DOCUMENTS

| | | |
|---|---|---|
| 0208137 | 1/1987 | European Pat. Off. . |
| 0224054 | 6/1987 | European Pat. Off. . |
| 0235443A1 | 9/1987 | European Pat. Off. . |
| 2101077 | 11/1971 | Fed. Rep. of Germany . |
| 3149106 | 6/1983 | Fed. Rep. of Germany . |
| 3604675 | 8/1987 | Fed. Rep. of Germany . |
| 3731079A1 | 3/1989 | Fed. Rep. of Germany . |

Primary Examiner—R. Skudy
Attorney, Agent, or Firm—Darby & Darby

[57] ABSTRACT

In the case of a universal electric motor for any kind of drive, with a stator package, a rotatably mounted rotor with commutator, as well as end shields on both sides that also constitute the bearings for the rotor and a switching ring that can be rotated through predetermined angular amounts and carries the (carbon) brushes, it is proposed to insert into the end shield A a closely fitting anchor block that serves for locking together the two end shields with the intervening stator package; further, the switching ring can be mounted on an external annular end face of the end shield B that also carries the switching strips or switching rails needed for switching between clockwise and counter clockwise rotation, complete with contact areas situated in the plane of the annular end face and suitable for axial contacting, the said contact areas making contact with other axial contact areas on the switching ring to establish connections with the carbon brushes.

25 Claims, 6 Drawing Sheets

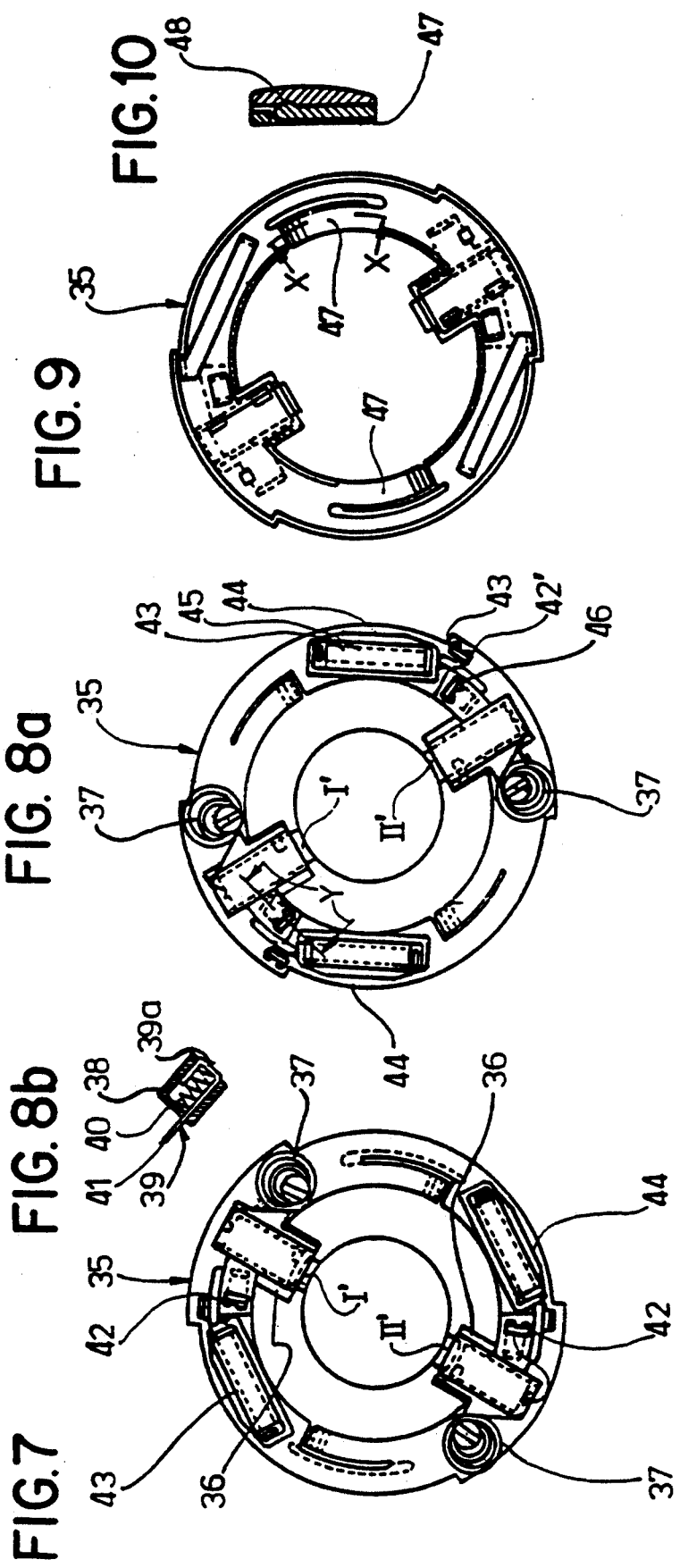

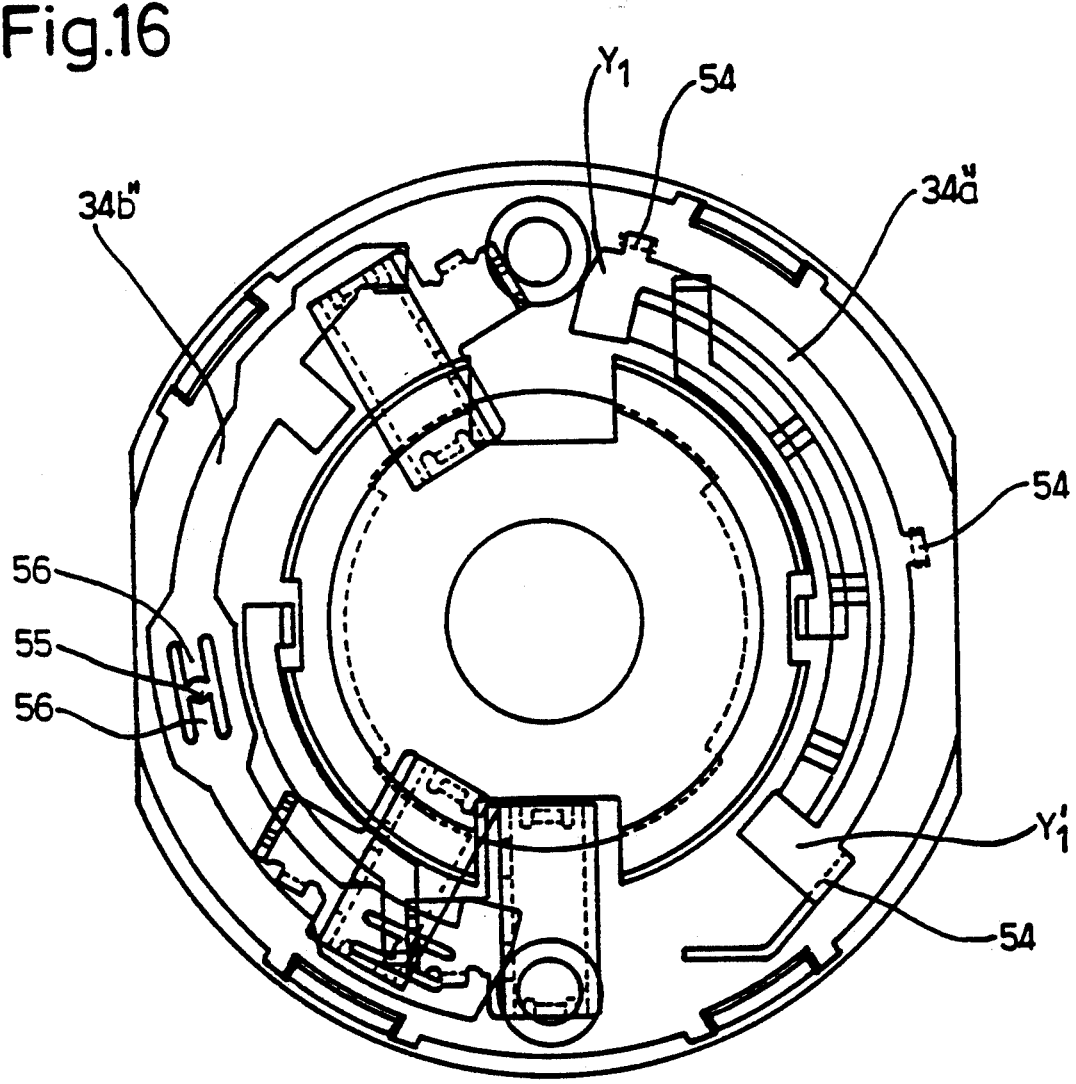

UNIVERSAL ELECTRIC MOTOR

BACKGROUND OF THE INVENTION

The present invention relates to a universal electric motor and an automated method of producing such a motor.

A problematical feature of a known universal motor of this type (DE-OS 37 31 079), with clockwise and counterclockwise rotation and intended for electric hand tools, is the fact that, for the purpose of operating the reversing switch, two contact springs exerting pressure in a radially inward direction are arranged on the circumference of a carrier ring; each of said springs is electrically connected to a brush-holder and at their neighboring but separate ends they each have a mains supply contact point and a field contact point. The pressure necessary for a reliable contact is therefore produced solely by the radially acting force of the springs, which are arranged within the axial space constituted by the carrier ring, a space that also contains the carbon brushes, and the possibilities of fouling and contact difficulties cannot therefore be excluded. The carrier ring of this arrangement is rotatably mounted on a central axial projection of the adjacent end shield and is maintained in its axial position by means of a retaining ring.

In connection with the switching of electric hand tools from clockwise to counterclockwise rotation it is further known (EP-PS 0208137) to design the device for displacing the brushes in contact with the commutator as a reversing switch in the form of two carrier bodies made of insulating material that can be coupled together, the two carrier bodies comprising interlocking collars that constitute a hollow space in which the contact elements for the reversal are arranged. This known hand tool also lends itself to substantially automated assembly, because the two carrier bodies are designed in the form of a contact holder for the contacts for the external connection of the hand tool or as a contact plate with the brush-holders and the contacting with the stator connections is obtained by means of axial contact lugs. Switching processes for changing the direction of rotation are made possible by the insertion of radially spring-loaded contact bands in holder pockets on the contact plate, so that contact, just as in the case of the previously considered electric hand tool of DE-OS 37 31 079, is once again produced in a radial direction.

In another known electric driving motor (DE-OS 31 49 106) the stator, which is constituted by a permanent magnet, is surrounded by an annular strip of metal, thereby creating a magnetic short-circuit, the said strip being on both sides axially adjacent to bearing holders and connected to them. These bearing holders are designed in the form of stirrups and each of them accommodates a bearing of the rotor shaft. One of these bearings is in the form of a roller bearing that is held directly in a cup-shaped hollow of the bearing holder and projects outwards from this recess by a predetermined amount. Consequently, it is possible to use this bearing element and, more specifically the outer ring of the roller bearing, which is necessarily perfectly centered with respect to the rotor shaft, for anchoring and centering other components attached to this motor. Nothing is said about the possibility of electrical switching; however, greater costs can hardly be involved here, since the stator consists of a permanent magnet.

It is further known (U.S. Pat. No. 4,613,781) to arrange an end-cap assembly unit on one side of an electric motor, the said unit comprising a plastic component in the interior of which there is embedded a large number of strip-shaped metallic conductors that establish the electric connections between the motor components and the brush-holders. To this end each electric line that is to make contact with a brush-holder is wound around a base area of the brush-holder, for which purpose the base of each brush-holder is provided with lateral flanges.

Further, the individual brush-holders are so designed that a side wall is bent away in the manner of a loop and is so extended as to make it reach under the carbon brush in the brush-holder in the manner of a hook, thereby enabling it for the time being to hold this brush—for assembly purposes—at a distance from the commutator ring of the rotor. Subsequently, i.e. after assembly, the hook is pressed further outwards, so that the carbon brush is released and it becomes possible for electric contact to be established between the brush and the commutator of the electric motor.

As regards components for an electric motor, it is further known (DE-GM G 85 20 258.4) to provide a plate made of insulating material and carrying a circuit arrangement, the said plate having a central opening to accommodate the commutator of an electric motor, and to provide on this plate, arranged diametrically opposite each other, single-piece frame parts to hold carbon brushes that can be connected to the circuit arrangement, the said frame parts being designed in such a manner that spring-pretensioned prolongations of the spring lead from spring-holders arranged by the side of the frame parts into the frame parts themselves. The springs are wound onto the spring-holders in the manner of a screw. At least a part of the electric circuit arrangement is embedded into the plastic circuit board.

This embedding of at least the essential components of the wiring needed for the operation of an electric motor is also known from DE-OS 36 04 675, where an insulating component surrounds the essential components of the conductor strip and also supports other components for the operation of the motor, brush-holders for example, which are likewise integrated into the component. The component is designed as a plate and has a central opening to provide a passage for the commutator of the motor.

In another electric motor of known construction mode (European Patent Application 0235443) a large number of electric components are arranged on an annular base board, the components making contact with the embedded electric conductors by virtue of the fact that the board partly bares these conductors for contacting purposes. The brush-holders, likewise carried on this board, are provided with extensions on the side of the edge that are clipped onto free parts of the conductors, so that it is possible to establish a secure physical connection between the conductors within the board and the brush-holder housings. The sole assembly costs incurred in arranging and supporting such a large number of individual components on the board, including separate, wound brush tensioning springs and the pins that carry them, are already considerable. Parts of the electric conductors embedded in the board project in this case beyond it in the axial direction, thereby making it possible to create contacts at other places, with the stator for example.

It is also known to design a beaker-shaped bearing bridge in a motor for an electric tool in such a manner as to enable it to accommodate the stator that is slid into it, the stator, in its turn, accommodating in its interior the freely rotatable rotor. On the side of the beaker-shaped bearing bridge the rotor shaft is seated in a roller bearing that is constituted by the bearing bridge. The bearing bridge further disposes of means for switching on and off, field plugs, and a radio interference suppression condenser. Arranged on the bearing bridge there is a pattern of contacts, which is designed as a punched grid for the optional connection of chokes, reversing switches, diodes and resistances. This punched grid is situated on the rotor-facing side of a switch array. A switching ring is also provided, and various contacts can be established as this ring is rotated, including contacts for direction reversal or speed reduction (European Patent Application 0224054).

In this connection it is also known (European Patent Application 0224054) to arrange the planar punched grid on one side of a brush-holder plate, with the carbon brushes situated on the other side of the brush-holder plate. Connection contacts for the field windings are obtained by means of connection lugs set at right angles to the principal plane of the punched grid. The punched grid in this particular case is designed as a continuous metal strip conductor and welded, glued or otherwise attached to the rotor-sided surface of the brush-holder plate, which is made of plastic material.

The problematical aspect of the known electric motors and/or components for them is that even though simplifying solutions are being obtained as regards certain individual features, the structures are still substantially too complex when one considers the cost incurred in respect of the individual parts, fitting them together and assembling the motor, especially when one bears in mind that such an electric motor should also have means to permit switching on and off and, above all, reversing the direction of rotation. But direction reversal, in particular, is normally associated with considerable circuit costs, so that problems that seem to bar the way to substantially automated assembly and low-cost production of such motors arise not only here, but also in connection with providing bearings for the brushes and the creation of good contacts between them and other circuit parts and, quite generally, in the entire basic structure and design of electric motors.

SUMMARY OF THE INVENTION

Consequently, it is the object of the present invention to create a universal motor that has a particularly simple structure and can therefore make do with few individual parts, combines outstanding operational reliability with great durability, meets all demands as regards electric switching possibilities, including switching on and and off and reversal of direction of rotation, and is yet so designed as to be capable of being produced on automated assembly lines without this going in any way to the detriment of its stability or, above all, the exact centering of the rotor with respect to the surrounding stator and/or the pole shoes of the latter.

The present invention solves this problem and has the advantage that it creates a self-contained universal motor that ensures accurate and secure stabilization of the individual motor components with respect to each other, including exact centering of the rotor with a uniform air gap between it and the stator along the entire circumference.

Given its markedly stratified construction mode, the universal motor according to the invention can be assembled in a fully automated manner, for which purpose only few individual parts are required, and, notwithstanding the incorporated possibility of switching between clockwise and counterclockwise rotation with an additional central "off" position, is characterized by minimal circuitry requirements in the area of the carbon brushes.

It is further particularly advantageous that both end shields i.e. both the end shield on the driving side (A-end) and the end shield on the side of the brushes (B-end), can be made of plastic materials and have a general pot-shaped form, so that particularly good insulation is obtained (double protection insulation), while perfect positioning of the parts with respect to each other and the possibility of their being firmly screwed together in an axial direction are yet assured, where a further special advantage is constituted by the fact that the universal motor does not require any additional supporting parts to sustain it in the machine or instrument housing in which it is accommodated, but is fully stable as a self-contained unit and also constitutes metallic fixing and attachment points, including—for example—a metal-to-metal junction in the vicinity of the bearing on the driving side with, if so desired, additional threaded holes, so that even the attachment of an appropriate gearing mechanism is made possible in a problem-free manner by the available clamping surfaces. The motor housing extends over the internal sheet-metal package of the stator on both sides and the modular assembly mode assures perfect air circulation and cooling in the interior of the motor, where—in particular—intensive currents of cooling air circulate also in the vicinity of the carbon brushes and the contacts.

A further advantage is the axial and yet outstanding contact established between the various contact points in the domain of devices for switching between clockwise and counterclockwise rotation, with tolerance equalization (compensation) obtained by means of simply structured spring contacts having particularly reliable contacting properties.

A further essential advantage consists of the fact that the contact strips for supplying current to the stator and for assuring the possibility of switching between clockwise and counterclockwise rotation are either embedded in or arranged on the end shield on the side of the brushes (end shield at the B-end), where the actual switching ring that carries the carbon brushes, as already mentioned, makes contact with the contacts in the end shield solely in the axial direction and is itself provided only with axial spring-pressure contacts that are connected to the carbon brushes and, upon rotation of the switching ring, become aligned with different contacts in the end shield, thereby assuring polarity reversal and, at one and the same time, also displacement of the brushes to improve the commutation.

With a view to assuring exact centering, both end shields are preferably provided with separate centering and ball bearing seatings, a metallic stabilization plate being inserted into the end shield at the A-end and securely fixed to its end face area, which forms a bulge to accommodate the ball bearing of the rotor shaft at this end and offers additional fixing possibilities as a result of this outwardly projecting journal shoulder.

The modular or stratified universal motor, which in this way constitutes a completely self-contained and operational unit, can be automated for large-scale series production, where the integrated inclusion of a fan wheel assures a particularly effective flow of cooling air through the motor.

Another special advantage must be seen in the fact that an air conduction ring is arranged inside the end shield at the A-end, adjacent to the aforesaid fan wheel, the said ring, which is inserted and secured in the manner of a bayonet catch, also constituting the anchor block needed for the axial screwing and final locking together of the two end shields, the stator, and the rotor bearings.

In view of the rotatability of the switching ring and the carbon brushes that are mounted on it, one also obtains a central in/out function quite independently of other external switches, where moreover all models can make use of the same wiring in the area of the switching ring and the end shield at the B-end facing it.

As far as automatic assembly is concerned, the motor can be assembled starting from a plane, i.e. from one side and proceeding layer by layer, where the possibility of complete external assembly of the motor also implies that it can undergo final testing outside the tool into which it is to be incorporated.

When the switching ring is rotated to switch from clockwise to counterclockwise rotation, one also obtains appropriate cleaning of the contacts, these contacts being arranged within a sealed space.

The features specified in the dependent and parallel claims make possible advantageous further developments and improvements of the universal electric motor. For example, the contact bridges carried by the end shield at the B-end can either be embedded in this shield in the form of webs, edgewise as it were, or they can be placed thereon as flat sheeting material and be secured by means of appropriate locking arrangements, either by providing the flat strips with dog legs that penetrate into the material of the end shield, or by arranging holding warts on the shield that are surrounded on both sides by resilient sheet metal parts, so that these sheet metal parts, upon being pressed into their final position, will penetrate slightly into the material of these holding pins or warts and can no longer be pulled off.

BRIEF DESCRIPTION OF THE DRAWING

Various embodiments of the invention are shown in the drawing and will be discussed in greater detail in the description given hereinbelow. The figures included in the drawing are as follows:

FIGS. 7 and 8a and 8b show elevations that illustrate the switching ring in its two terminal positions, in each case complete with the brush holders, the radio interference suppressors and the brush tensioning springs, while FIG. 9 shows the switching ring from the rear, i.e. as seen from the side facing the end shield;

FIG. 10, by way of detail, shows a section along the line X—X in FIG. 9;

FIG. 13 represents an elevation of the end shield of FIG. 4 as seen from the left, a view in which the two mains supply contacts to the stator windings are clearly visible, while FIG. 16 shows two other possible ways of arranging and/or embedding the switching contact strips mounted on end shield B.

DESCRIPTION OF THE PREFERRED EMBODIMENTS

Figure 1:
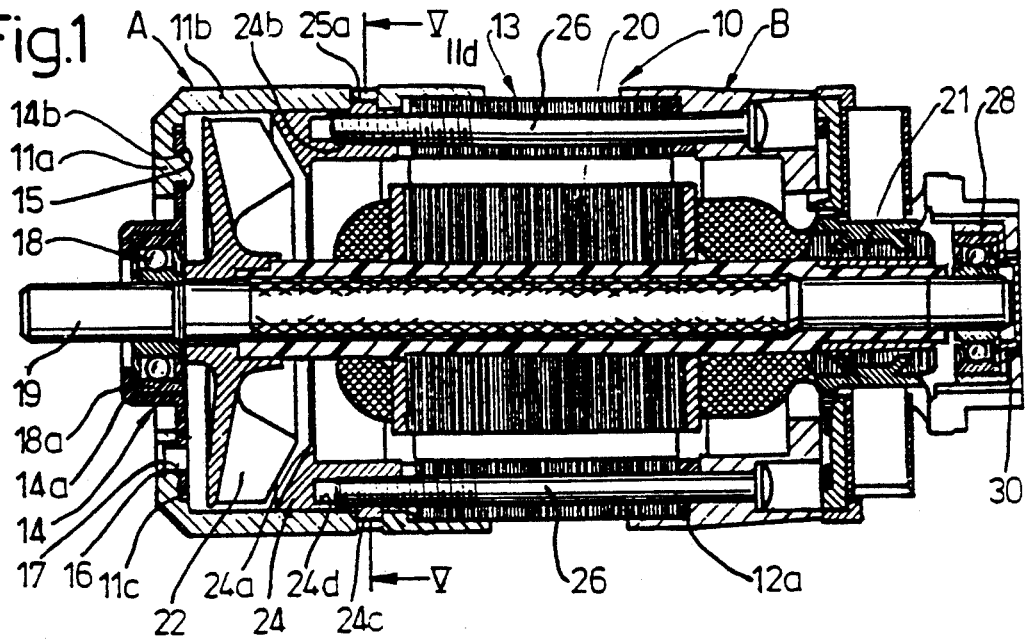
FIG. 1 shows a longitudinal section through a possible embodiment of the universal electric motor according to the invention as ready for use following final assembly.
Figure 2:
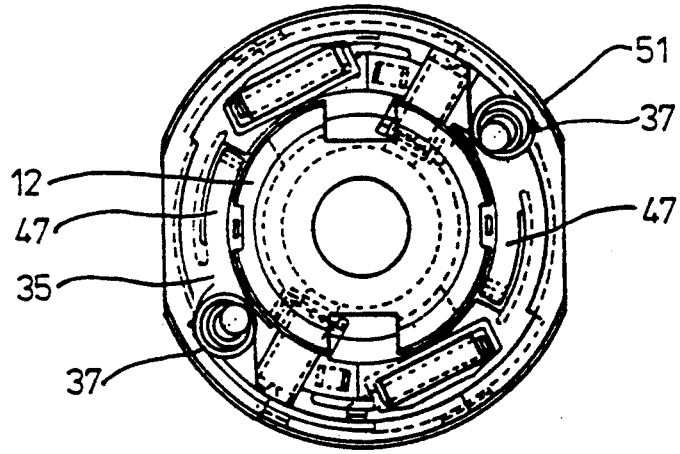
FIG. 2 shows an elevation of the universal motor of FIG. 1 as seen from the right, where the switching ring with the carbon brush holders can be recognized through the superposed retaining ring.

In FIG. 1 the universal electric motor is indicated by reference 10, the end shield at the driving side (end shield A) at the left of the drawing is indicated by 11, and the end shield on the side of brushes (end shield B) is indicated by 12. In describing the individual parts of the motor, the overview to be given hereinbelow will follow the steps of the assembly of these parts, i.e. the sequence in which they are brought together and secured to each other in fully or partly automated production, where the motor is built up step by step; commencing from the left.

The end shield (A) 11, on the left—and basically also the end shield (B) 12 on the right—has a generally pot-shaped structure and comprises a floor plate 11a that preferably merges as a single piece into the inwardly projecting side piece 11b. End shield 11, as well as end shield 12, is preferably made of an appropriate tough plastic material, where the side piece 11b—by means of a shoulder 11d—forms a fitting recess to accommodate the stator 13 on this side, if necessary with the interposition of a gasket (not shown).

The pot form of end shield A is further provided with a circular opening 11c in the floor plate that serves to accommodate a stabilization and bearing plate that will be discussed further below. With a view to fixing the stabilization plate 14 to the interior of the pot floor of end shield A, the pot floor is provided with inwardly projecting knobs 15, which are preferably evenly distributed over the circumference; the floor plate of the pot-shaped end shield A is also provided with boreholes 16, which serve to accommodate threaded sleeves 17 arranged in corresponding positions in the stabilization plate 14. The stabilization plate itself accommodates in a central protuberance the outer ring 18a of a first ball bearing or roller bearing 18 for the rotor shaft 19. At this end the rotor shaft 19 also projects beyond the outline of the motor body, so that the torque produced by the motor can here be transferred in an appropriate manner, though this need not be further described here.

During assembly the stabilization plate is therefore the first to be introduced into the pot form of end shield A and is given its initial fixing by making the knobs 15 pass through corresponding bored openings 14b in the stabilization plate, with a subsequent assembly step that, by means of appropriate heating, a laser beam treatment say, produces a widening of the projecting parts of the knobs 15, so that the stabilization plate becomes firmly anchored to the floor plate of the end shield. Note that the outer part of the protuberance that carries the ball bearing 18 on the inside also projects beyond the rear of the floor plate of end shield A, so that straining means or the like can be attached at this point, either to fix the motor or to fix gear mechanisms and the like that are to be mounted on the output shaft.

Figure 3:
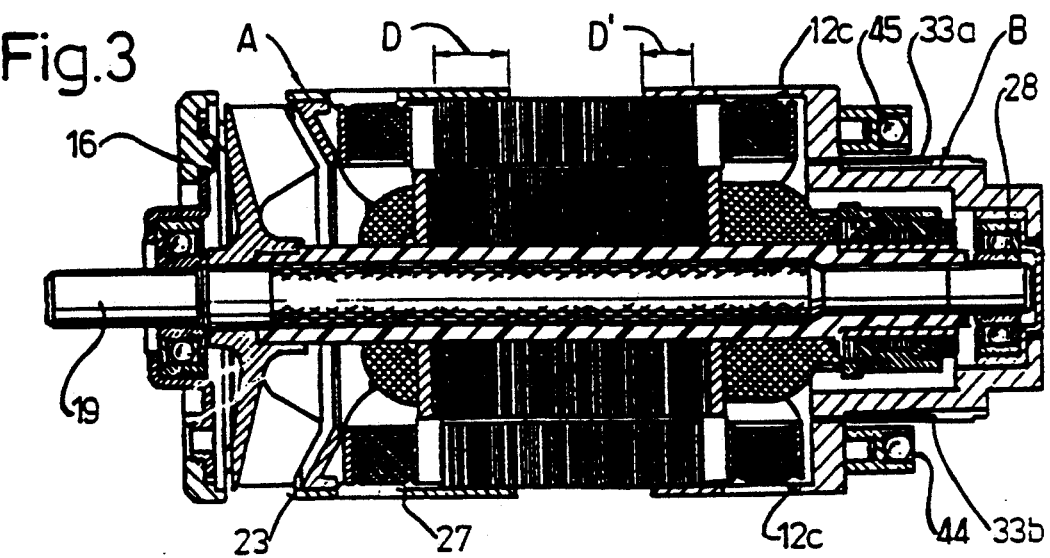
FIG. 3 shows a longitudinal section through the embodiment of the universal electric motor similar to that of FIG. 1, but turned through 90°.

The preassembled unit consisting of the rotor shaft 19 with the rotor 20, the ball bearing 18 slid against an annular stop of the rotor shaft 19, as well as the commutator 21 and the fan wheel 22, the latter rigidly attached to the rotor shaft 19 between the ball bearing and the rotor, can then be introduced into the end shield A. As can be seen more clearly from the illustration in FIG. 3, the pot shape of end shield A, opposite the fan wheel 22, is provided with slots or openings 23 that extend over a part of the circumference, so that the fan wheel 22—during operation of the motor—can freely expel to the outside the air that it sucks in through the interior of the motor from the right.

The next step of the assembly consists of introducing into the pot shape of the end shield 11 a further ring-shaped component that hereinafter, given the auxiliary functions for ventilation and cooling it performs in association with the fan wheel 22, will be referred to as the air conduction ring 24. However, this ring also performs a further important design task that will now have to be discussed in some detail.

The air conduction ring 24 is of a cylindrical annular shape and has an inwardly projecting annular edge 24a adjacent to the fan wheel 22, so that the suction effect of the fan wheel 22 is substantially improved in this area, this being due to the fact that the rotary motion of the fan, sucking air from the center around the rotor shaft 19, produces a partial vacuum in that area, which will therefore ensure an appropriate flow of cooling air from the interior of the motor to the right and subsequently expel this air in a radial direction through the ventilation openings 23 of the pot-shaped housing.

Figure 5:
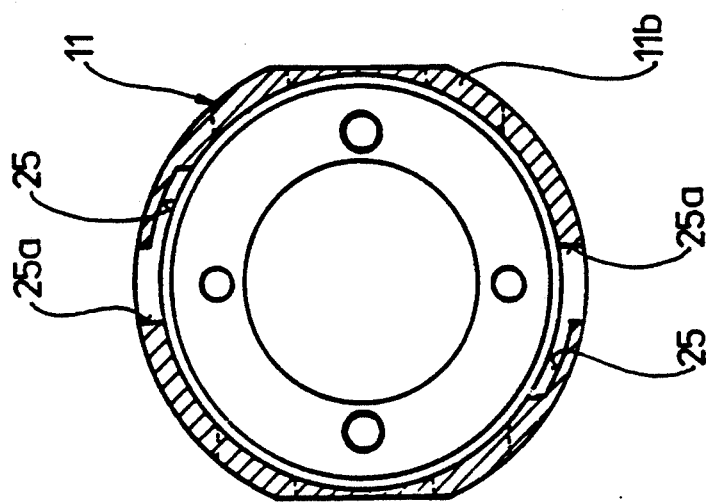
FIG. 5 shows a section along line V—V of FIG. 1, but omitting all details other than the end shield at the A-end.

The external annular surface of the air conduction ring 24 fits flushly into the interior of the pot shape of the end shield A, where additional anchorage between these two components is ensured by an appropriate catch, which in the embodiment here illustrated can be described as a bayonet catch safety device. To this end, as can be seen in greater detail from FIG. 5, the side piece 11b of the end shield 11—possibly in a diametrically opposite position—is provided with axially elongated grooves 25, which in a predetermined position adjacent to the fan wheel 22 merge laterally with the openings 25a in the wall of the end-shield side piece 11b. Appropriately aligned therewith, the cylindrical outer surface of the air conduction ring 24 is provided with axial extensions of what is also an envelope-like thickening 24b, which merge outwards into the projections 24c (FIG. 1), the projections corresponding to the openings 25a of the end shield. The axial extensions 24b are also provided with axial bores 24d, which serve to accommodate the screws 26 that, in their turn, serve to keep the motor parts together. This aspect will be discussed further hereinbelow.

Figure 6:
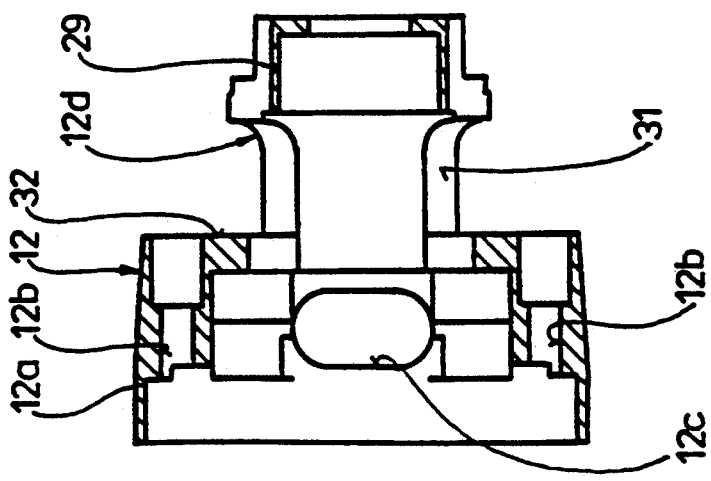
FIG. 6 shows a section through end shield A complete with the inserted air conduction and anchor block ring after the latter has been rotated into its final and secured position.

The air conduction ring 24 is therefore first placed into the pot shape of the end shield in such a manner that its outwardly-pointing projections 24c, which serve as catches to lock it to the end shield, will slide axially downwards along the grooves 25, whereby it also becomes possible to slide the air conduction ring 24 into the pot shape of the end shield 11. As soon as the air conduction ring then attains its final position shown in FIGS. 1 and 3 (i.e. bearing against the stop constituted by the ends of the longitudinal grooves 25), the air conduction ring is rotated sufficiently far to enable the projections 24c to drop into the openings 25a, so that it attains the final position in which—as shown in FIG. 1 and even more clearly in the representation of FIG. 6—the projections 24c have dropped into the window-like openings 25a and thus fix the air conduction ring securely in this position. The necessary rotation of the air conduction ring is indicated in FIG. 6 by means of the arrow A. One thus obtains a bayonet catch fixing of the air conduction ring in the pot housing of the end shield and, at one and the same time, a firm axial fixing of the air conduction ring, which in its second position serves as the anchor block for interlocking the two end shields 11 and 12 by means of the tensioning screws 26.

Indeed, following this assembly step of positioning the air conduction ring, the end shield B, shown on the left in the plane of the drawing, is also slid onto the stator package until the fitting recess constituted in the end shield by the shoulder in the cylindrical part 12a comes to bear against the stator, where a particularly advantageous variant of the present invention has to be seen in the fact that the formation of the fitting recesses in the two pot-shaped end shields 11 and 12 enables the side pieces of the end shields to accommodate the stator package on both sides and to overlap and fix it for a pregiven distance D and D' (FIG. 3), a particularly advantageous feature that contributes greatly to the stability of the universal motor according to the invention.

Figure 4:
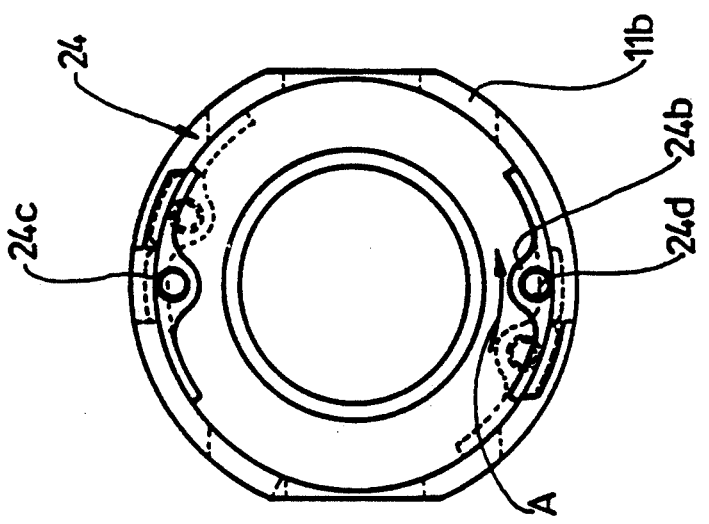
FIG. 4 shows a longitudinal section through the end shield at the right-hand side (B-end) of FIGS. 1 and 3.

The end shield 12 at the B-end is separately shown in FIG. 4 and comprises, all as a single piece, the basic cylindrical part 12a with the fitting recess formed in the side wall, the figure also affording a view of the openings 12b through the outer edge for the tensioning screws 26, these openings forming an appropriate shoulder for the screw heads to bear against. In this area there are also provided the air passages 12c adjacent to the winding heads of the stator passage; similar passages opposite the winding heads are also provided in the side piece 11b of end shield A and are there indicated by reference 27. These passages ensure that effective cooling will occur even when the motor is switched off and, consequently, the fan is likewise at rest.

The cylindrical part 12a of the end shield B merges with a central axial extension 12d, this lengthening piece constituting a housing to accommodate the right-hand roller bearing 28 of the rotor shaft 19. As shown in FIG. 1, the ball bearing 28 can be accommodated in the seating recess 29 (FIG. 4) formed by the extension 12d, possibly after interposition of a metallic multi-stepped insert 30.

With a view to permitting the passage of the carbon brushes carried on a switching ring, the extension 12d is provided with corresponding and generously dimensioned openings 31, these openings permitting also a rotary displacement of the carbon brushes on the commutator as required for switching from clockwise to counterclockwise rotation.

After the end shield (B) 12 has been slid onto the partial assembly unit, as previously discussed, and consisting of end shield A, the stabilization plate and the rotor with fan and air conduction ring, the entire assembly is locked together by means of the previously mentioned tensioning screws 26, which pass through the openings 12b and through similar openings in the lamellar core of the stator to reach the bored reception sockets 24d of the air conduction ring 24, which therefore acts also as the anchor block for these screws.

Once the tensioning screws 26, which are provided with an appropriate self-cutting (coarse) thread, have been screwed into the reception sockets 24d of the air conduction ring, they also ensure—as can best be seen from FIG. 1—that the projections 24c will be pressed more firmly and strongly into the openings or passages 25a in the end shield 11 at the A-end, so that the locking together of the motor also ensures a secure and close-fitting seating for the anchor block and, simultaneously, the air conduction ring. If so desired, the interlock between the projections 24c and the openings 25a can be so designed that the two parts will come to fit more closely and be wedged together more strongly as the tensioning screws are driven home, possibly by means of a kind of dove-tailed interfit; in this connection the interlocking surfaces may also be appropriately bevelled.

Thus, although neither the brushes, nor the electric brushes or electric contacts have been positioned to this point of the assembly procedure, the universal motor is now fully assembled, except for this area, complete with the two bearings 18 and 28 for the rotor shaft 19 and the perfect centering of the rotor between the two end shields A and B, which have been screwed and clamped together and to the stator package as well. This centering is achieved by the telescopic fit of the opposite axial ends of the stator 13 in the respective end shields 11, 12.

Be it noted, however, that fundamental importance attaches to a particular measure in connection with the circuitry in the contact area, namely that end shield B, as the counterelement of the previously mentioned switching ring shown in FIGS. 7, 8 and 9, is itself the part that carries and supports the contact strips, which rest flat on the end face 32 of this end shield (FIG. 4) in the transition to the axial extension 12d or, in any case, and this is yet another essential feature of the present invention, constitute flat contact areas in this plane for contacting in the axial direction.

Figure 13:
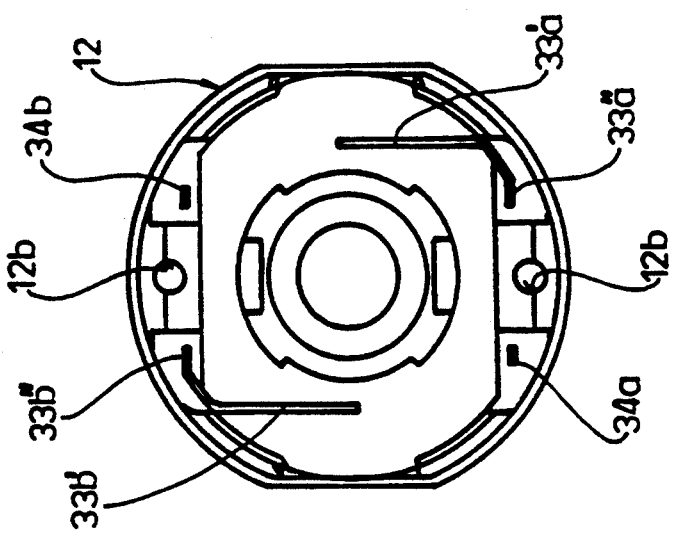

Over and above its other tasks, end shield B is therefore also the principal carrier of the contacts serving to ensure electrical connection of the stator and to make possible the contacting of the carbon brushes. The patterns of the contact strips can best be seen from FIG. 11 read in combination with FIG. 13.

Figure 11:
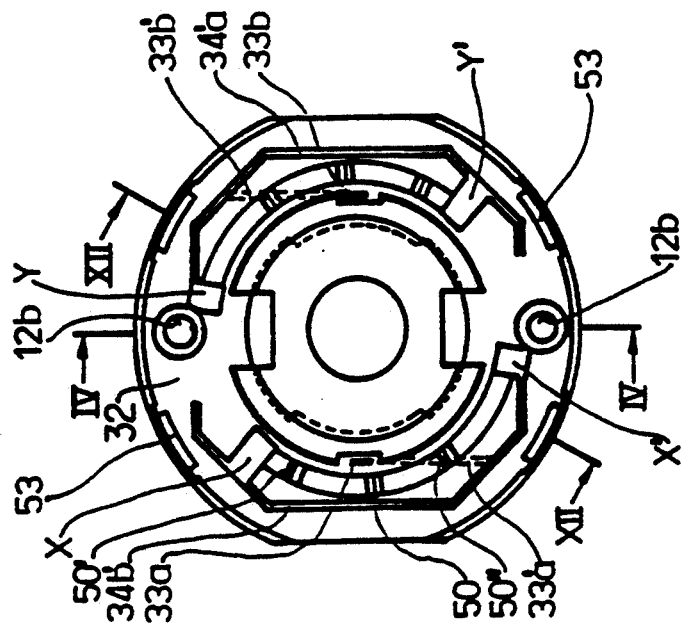
FIG. 11 shows the end shield of FIG. 4 in elevation as seen from the right, complete with the contact strips embedded in it on the side facing the switching ring (not shown in this view)

FIG. 11 shows the outwardly-pointing annular end face 32 of the end shield 12 at the B-end, so that this figure also affords a view of the bored openings 12b for the locking screws. The plug-in contacts for the mains supply are indicated by references 33a, 33b; as is shown also by FIG. 3, they pass through the material of the end face 32 or are arranged within this material as secant-like longitudinal contact strips 33a', 33b' and, as can be seen from FIG. 13, emerge as the axial plug contacts 33a", 33b" on the side of the end face facing the stator, this being the face shown in FIG. 13, where electrical connection is then established by means of appropriate axial plug contacts with the stator connection terminals.

With a view to connecting the terminals leading away from the stator, the end shield is provided with the further plug-in contacts 34a, 34b, thereby completing the square of the axial plug contact arrangement, the further contacts then merging into the contact strips 34b', 34a' shown in FIG. 11. Taken by themselves, the contact strips, especially the repeatedly kinked contact strips 34a', 34b', may follow an arbitrary pattern; in the embodiment illustrated by FIGS. 11 and 13 these contacts strips, which constitute flat rails, are as it were embedded edgewise in the material of the end face 32 of the end shield—though different embodiments are also possible, as will be further discussed hereinbelow, especially by reference to FIG. 16.

Figure 14:
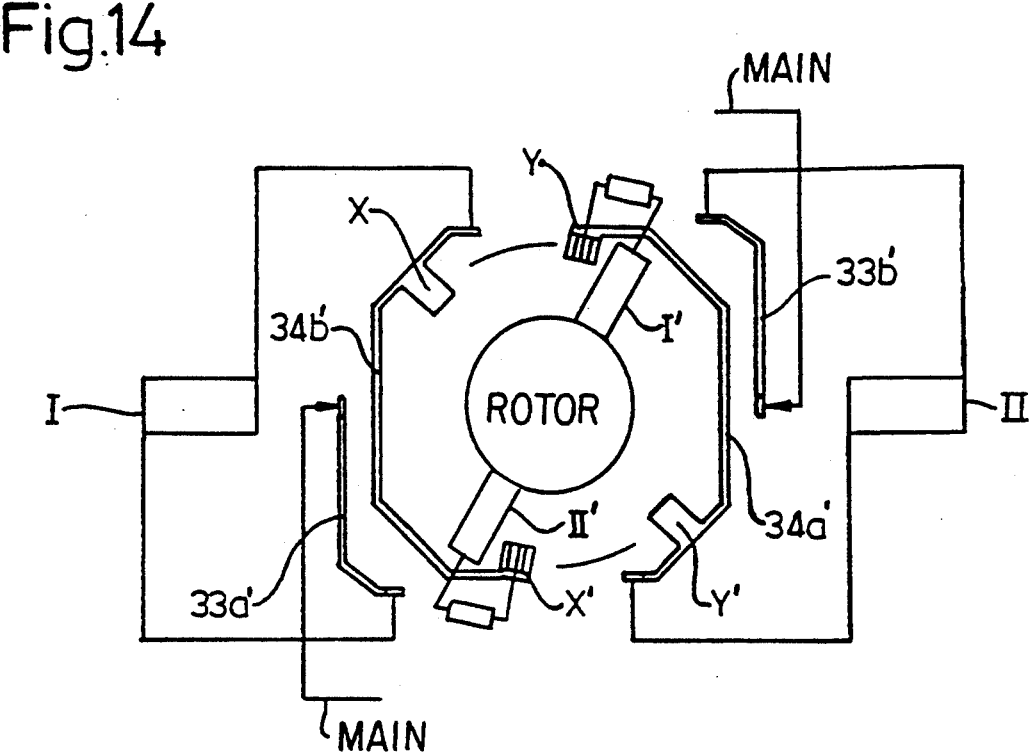
FIGS. 14 and 15 show the schematic wiring diagrams of the universal motor according to the invention, with the switching ring respectively in either one or the other terminal position and with the radio interference chokes inserted between the carbon brushes and the stator connection contacts; and lastly
Figure 15:
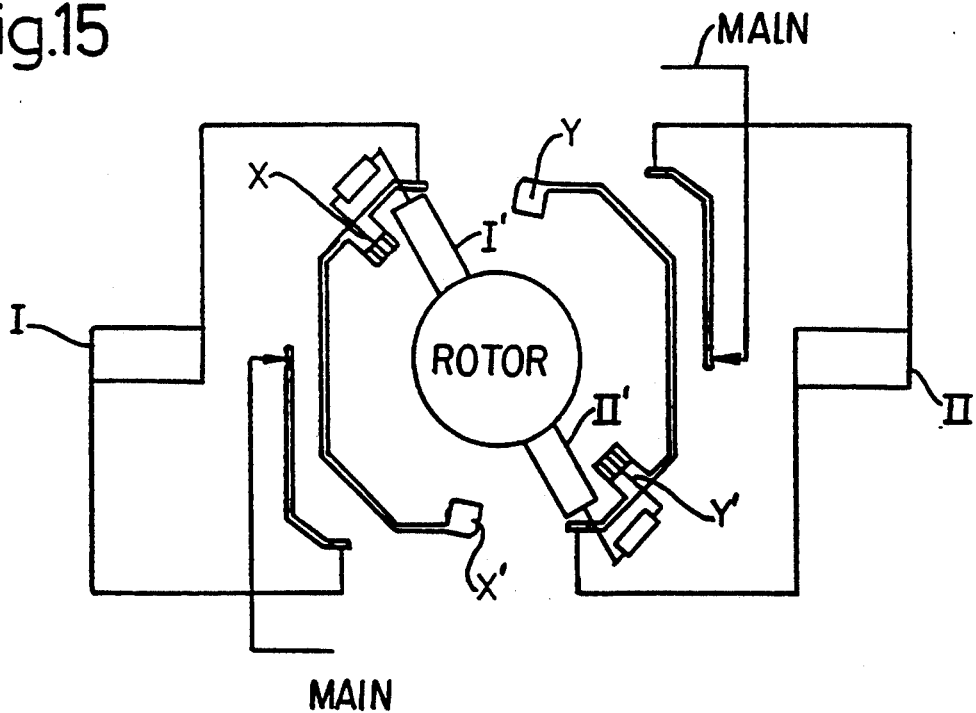

Considering the pattern of the contact rails or strips so far described and referring also to the illustrations afforded by FIGS. 14 and 15, one will recognize quite readily that the current path is quite generally such as shown in FIG. 14, i.e. from the mains connection at the top to the contact strip 33b' and from the latter—via an axial plug contact—to field winding II, from field winding II to the first switching (reversing) contact strip 34a'; from this switching contact strip the current flows via one of the axial contact points of that strip—this aspect will be discussed further on—to carbon brush I' and, via the rotor, to carbon brush II', thence to the switching contact strip 34b' and, via the axial plug contact constituted by 34b(FIG. 13), to field winding I and, via the second mains-supply contact strip 33a', back to the lower mains connection shown in FIG. 14.

By comparison with FIG. 15, which shows the same representation as FIG. 14 but with the switching ring and the brushes mounted thereon appropriately rotated, one readily notes that the carbon brushes, which are connected to the rotor via the commutator, will commutate the polarity of the rotor connections with respect to the polarization of the field windings, which remains unchanged, thereby causing a reversal of the direction of rotation; since this direction reversal is accompanied by the repositioning of the carbon brush contact areas on the commutator, equally good commutation can be obtained in both cases and, consequently, also comparable efficiencies in both directions of rotation.

Therefore, as already explained above, the switching contact strips 34a' and 34b', which are either embedded into the material of the end face of the end shield or placed flat on that face, will in each case constitute two contact points or contact surfaces that in FIG. 11 are designated, respectively, by X and X' and by Y and Y'.

As a result of this arrangement of the contact strips or contact links either in or on end shield B, one also obtains an effective simplification in the design of the switching ring. This ring is shown in greater detail in FIGS. 7, 8a, b and 9, where FIGS. 7 and 8a show otherwise identical views, though with the ring itself bearing respectively against the terminal stops that define its position for clockwise and counterclockwise rotation, while FIG. 9 shows the switching ring as seen from the other side. This switching ring, which is indicated by reference 35, will now have to carry only the holders 36 for the carbon brushes I' and II', complete with the appropriate tensioning springs 37 for the carbon brushes, and is preferably made of some suitable stable insulating material (plastic material, as are indeed also the air conduction ring 24, the two end shields, a retaining ring for the switching ring and possibly also the fan wheel 22).

Since the contact points X, X' and Y, Y' for establishing the electrical connection of the carbon brushes are designed as axial flat contacts lying in the plane of the end face 32, it will be necessary for the side of the switching ring opposite this end face to be provided with corresponding flat axial contacts, which will then come to rest in full-faced axial contact with the contact areas formed by the switching contact strips. In this connection, and with a view also to obtaining the necessary spring-provided contact pressure for these contact areas, axial hollow projections are arranged on the side of the switching ring 35 facing away from the rotor, these projections being open in the direction of the end face 32 and the contacts X, X' and Y, Y' carried on that face—a detail of such a hollow projection is shown in cross-section as FIG. 8b between and just above FIGS. 7 and 8a and is there identified by reference 38. The section line for this detail is indicated in FIG. 8a by Y—Y.

Arranged within the hollow projection there is a contact stirrup 39 bent in the manner of a U and subject to the action of a tensioning spring 40, so that the contact face 39a of the stirrup is pressed forward by the spring 40 in the direction of the contact areas X, X' and Y, Y' of the switching contact strips 34a' and 34b', where—as can readily be seen from FIG. 11—these axial contact areas of the switching contact strips are obtained, in this particular embodiment, by bending down the contact strips that are embedded edgewise in the material of the end shield 12.

The contact tongue 41 at the end of the U-shaped contact stirrup 39 opposite to its contact surface 39a passes through the closed bottom of the hollow projection 38, and the ends of these contact tongues then serve to receive the contact terminals (clamps) 42, each of which is connected to its respective carbon brush as shown in FIG. 7. Such broad-faced axial contacts not only ensure perfect contacting, but also exert a continuous cleaning action on the contact surfaces, because they have to slide over each other under pressure before the final contact position can be attained.

The basic conception of the invention regarding structure and design, especially in the domain of switching and contacting by means of a switching ring subject only to slight stresses, makes possible an other advantageous feature of the present invention, namely the fact that holders 44 intended to accommodate ratio interference suppressor chokes 43 connected in series between the field winding and the carbon brushes can be integrated into the switching ring without creating any substantial problems. The inclusion of suppressors in the motor circuit can then be obtained by means of a simple change-over arrangement. For example, if in the representation of FIG. 7 each carbon brush connection is connected directly to the contact tongue 41 of the spring-controlled U-shaped stirrup contact, it is also possible for the contact terminal (clamp) 42' associated with each carbon brush connection (FIGS. 8a, b) to be connected to a separate contact tongue 43 that is arranged adjacent to the contact tongue 41 and whose other end, as indicated by means of the dotted line and reference 45 in FIG. 8a, is led under and along the suppressor holder in the switching ring 35 to reach its other terminal, so that upon inclusion of the choke 45 its other terminal can be plugged onto the contact tongue 41 by means of the usual clamp connection 46.

The respective terminal positions for reversing the contacts from clockwise rotation to counterclockwise rotation, as well as an additional central zero (or "off") position, can also be provided with locking devices by arranging for the switching ring to be provided with either one or two tongues 47, which—when two such tongues are used—will preferably be arranged diametrically opposite each other. These tongues run along the internal circumference of the switching ring and are formed by part-circular incisions parallel to that circumference, each of these tongues being provided with a projection 48 pointing in the direction of the end face 32 (FIG. 11) of the end shield at the B-end, as shown in FIG. 10. By means of these nose-like projections 48, the tongues can engage with corresponding recesses 50, 50' and 50" (also arranged along appropriate part circles) on the end face 32 of the end shield, and therefore define the two terminal positions for switching between clockwise and counterclockwise rotation, as well as the central position, i.e. with the catch in recess 50, where the motor is switched off. With this arrangement, therefore, it becomes possible to switch the motor on and off by means of the same control that switches it between clockwise and counterclockwise rotation.

The switching ring 35, complete with the devices just described, is slid over the axial extension 12d of the end shield and pushed forward until its spring-controlled contacts 39a on the side facing the end shield effectively come to bear against the end face 32.

Figure 12:
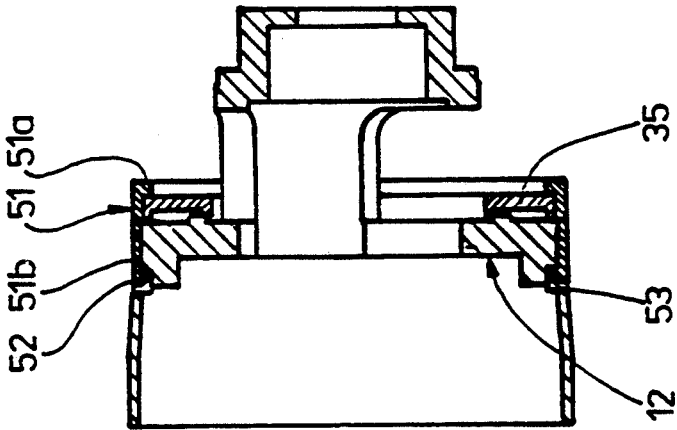
FIG. 12 shows a section along the line XII—XII of FIG. 11.

Lastly, the switching ring is fixed in position by means of a retaining ring 51 (FIG. 12), which preferably bears against the outer edge of the switching ring 35 by means of an annular flange 51a projecting towards the interior and thus retains it in position to perform the appropriate rotary motion, the retaining ring 51 itself engaging—by means of axial projections 51b that are best evenly distributed over its circumference and carry appropriate stop dogs 52 at their ends—corresponding to recesses 53 in the outer wall of the end shield 12.

This completes the structure of the universal motor, so that its automated assembly, which can be performed by proceeding from one end or plane, calls for no more than seven parts or subassemblies, namely the end shield at the A-end shown on the left in FIG. 1; the stabilization plate joined to the floor plate of this end shield; the subsequently inserted subassembly consisting of rotor shaft, rotor, fan wheel and the two bearings; the air conduction ring that also constitutes the anchor block for locking the motor; the right-hand end shield; the switching ring carried on the outer annular surface of this end shield with the appropriate contact strips and links mounted thereon; and the retaining ring that maintains the switching ring in its axial position on the end shield while leaving it free to perform partial rotary motions.

In appropriate variants of the present invention it is also possible as an alternative to the contact strips and springs as hitherto described, i.e. embedded edgewise in the material of the end face of end shield B, so that the flat contacts are subsequently formed by bending down their projecting parts, to lay these contact strips—fully punched out to their correct annular shape, appropriately bent and complete with their terminal contacts Y1 and Y'1, all as indicated under reference 34a" in FIG. 16—onto the end face and to secure them thereto by means of lateral projections that, as indicated by reference 54—are bent down and inserted into the material of the end face of the end shield.

Lastly, an alternative embodiment involving such a semi-circular flat conductor strip placed onto the end shield in full contact, but fixed thereto without any parts having to be bent back, is the one shown under reference 34b", where openings 55 are left at appropriate places in the flat strip conductor and a resilient spring 56 is provided on each side of and immediately adjacent to these holes. In this fixing method, which is known per se, the openings 55 are then forced onto pins projecting from the end of the end shield and having a slightly larger diameter, so that the sharp-edged leading edges of the springs 56 will tend to bite into the pins with which they are in contact and removal of the contact strip fixed in this manner is no longer possible. It is to be understood that several such fixing devices are provided along each conductor strip. These two fixing methods are possible in addition to the embedding (possibly by injection molding around the conductor) discussed in the first embodiment, because these contact surfaces, given the axial contacting assured by the switching ring, are as it were additionally retained in position. The contacting here provided therefore comprises a spring contact with a U-shaped stirrup, complete with pressure spring, with expressly axial contact-making and contacting in one plane by means of the pressure developed by the appropriate spring.

The holders for the carbon brushes and those for the radio interference suppressors can be formed on the switching ring directly during the molding process, and the suppressors can be inserted without difficulty by means of a changeover arrangement and the contact leading to the suppressor choke is led under the suppressor holder, so that once again a minimum of encumbrance is created.

All the features mentioned in the description, in the claims hereinafter and in the drawing may be essential to the invention either individually or in any combination thereof.

We claim:

1. A universal electric motor for any drive application, comprising:
   a rotor rotatably supported along a rotational axis, said rotor having a commutator, and a first end and an axially opposed second end;
   a first end shield being pot-shaped and having an end face connected to a cylindrical portion, said cylindrical portion including at least one opening therethrough;
   a second end shield being pot-shaped, said first end shield having a first bearing for rotatably supporting said first end of said rotor, said second end shield having a second bearing for rotably supporting said second end of said rotor;
   switching means mounted on said second end shield and electrically connected with said rotor for changing direction of rotation of said rotor in operating said motor;
   a stator having stator field windings, said stator being axially and concentrically positioned between said end shields;
   an air conduction ring, said ring being received concentrically in said first end shield at a position axially between said stator and said first end face;
   connection means positioned between said conduction ring and said first end shield, said connection means including at least one radial projection engageable in said at least one opening in said cylindrical portion of said first end shield, said conduction ring and first end shield being fixedly joined together;
   means for internally connecting said second end shield directly to said conduction ring one of said stator field windings retained therebetween, said means for internally connecting extending through said stator field winding; and
   dimensions of the end shields, rotor, stator field windings and conduction ring producing automatic axial self-alignment of said motor upon assembly, said end shields and stator windings forming an enclosure for said rotor.

2. A universal motor as in claim 1, wherein said stator field windings are axially aligned with said end shields, opposite axial ends of said stator field windings being respectively received telescopically within said first and second end shields.

3. A universal electric motor as in claim 1, wherein said end shields each overlap said stator field windings by predetermined distances, a position of said stator field windings being fixed thereby.

4. A universal electric motor as in claim 1, wherein said conduction ring includes a projection and said first end shield includes a groove, and said conduction ring is connected to said first end shield with a bayonet-type catch which engages said projection in said groove.

5. A universal electric motor as in claim 4, wherein said bayonet-type catch includes at least one longitudinal groove extending in an axial direction in an inside surface of said first end shield, said at least one radial projection on said conduction ring during motor assembly sliding in said at least one groove, each said groove merging with one said opening in said cylindrical portion of said first end shield, said projections being received in said openings when said conduction ring is rotated following axial sliding in said grooves during motor assembly.

6. A universal electric motor as in claim 1, wherein said means for internally connecting said second end shield directly to said conduction ring includes tensioning screws, said screws, when received in said conduction ring, force said at least one resiliently mounted projection against a wall defining said at least one opening in said first end shield.

7. A universal electric motor as in claim 6, wherein said connecting means further comprises a dovetail projection and a beveled wall at interfaces between said first end shield and said conduction ring to enhance seating of said conduction ring with said first end shield.

8. A universal electric motor as in claim 1, wherein said second end shield includes an extension contracted in diameter axially away from said rotor wherein said second bearing of said rotor shaft is seated, an external annular end face being formed on said second end shield by said contraction, said end face having openings therethrough to permit passage of said means for internally connecting said end shields, said annular end face including at least four flat axial switching contacts, said switching means including associated contact areas for axial connection to said switching contacts on said annular end face.

9. A universal electric motor as in claim 8, wherein said annular end face includes connections for a mains supply to the stator windings and switching contact strips arranged on the end face and penetrating into said end face, said switching contact strips extending through said second end shield for connection to the stator windings, said motor further comprising two contact connections that are spring-tensioned in the axial direction and connected to carbon brushes carried on the switching means adjacent said annular end face.

10. A universal electrical motor as in claim 8, further comprising first connection lugs on said second end shield for establishing connection with a mains supply connection, means for connecting said first connection lugs to electric connection terminals of the stator, and second connection lugs extending from an end face of the second end shield facing the stator and extending through the second end shield to form on a side facing the switching means flat axial contacts for reversing direction of rotor rotation of said motor.

11. A universal electrical motor as in claim 10, wherein conductive strips are set edgewise into the annular end face of the second end shield and are bent to form the flat axial contacts.

12. A universal electric motor as in claim 10, wherein the second connection lugs lie flat on the end face of the second end shield, short axial extensions from the second connection lugs penetrate into the second end shield holding said second connection lugs in position.

13. A universal electrical motor as in claim 10, wherein the second connection lugs lie flat on the end face of the second end shield, small pins projecting from the end face being gripped on both sides by resilient tongues of the second connection lugs.

14. A universal electric motor as in claim 8, wherein the switching means, on its side facing away from the end face of the second end shield, includes carbon brushes.

15. A universal electrical motor as in claim 8, further comprises brushes for contacting said commutator, and wherein, for ensuring secure axial contacting between areas on the annular end face of the second end shield and connection contacts to the brushes, said connection contacts are spring-controlled U-shaped strips carried in hollow axial projections on the switching means, a flat portion of each said U-shaped strip being pressed against the contact areas formed on the annular end face of the second end shield, another portion of each said strip connects to a brush connection.

16. A universal electric motor as in claim 15, further comprising a radio interference suppressor and a suppressor holder and wherein, adjacent to the spring controlled U-shaped strip on the switching means is provided a contact tongue and a selectively operable clamp for connecting to said radio interference suppressor.

17. A universal electric motor as in claim 8, wherein resilient, peripheral tongues are formed in the switching means that terminate in a nose-like projection pointing parallel to the annular end face of the second end shield, locking recesses being arranged in said second end shield at predetermined angular distances for engagement with said nose-like projections, whereby a central position of the switching means is selectable for switching the electric motor on and off, and in two terminal angular positions of the switching ring connect the rotor for respective clockwise and counterclockwise rotation.

18. A universal electric motor for any drive application, comprising:

a rotor rotatably supported along a rotational axis, said rotor having a commutator, and two axially opposed ends;
a first end shield being pot-shaped and having an end face connected to a cylindrical portion;
a second end shield being pot-shaped and having an external annular face, each of said end shields having a bearing for rotatably supporting a respective end of said rotor, said second end shield having a central axial extension for supporting said bearing, said extension being on a side of said second end shield away from said rotor and having said annular face;
an annular switching ring positioned on said external annular face of said second end shield concentrically with said axis, electrical conductors on said switching ring slidingly contacting said conductors on said annular face, said ring being reversibly rotatable through a predetermined angular range, said central axial extension of said second end shield extending through a central opening in said switching ring;
a stator having stator field windings, said stator being positioned between said end shields;
brushes in respective holders mounted to said switching ring for movement therewith and engageable with said commutator; and
means for connecting said second end shield to said first end shield with said stator field windings retained therebetween.

19. A universal electric motor for any drive application, comprising:
a rotor rotatably supported along a rotational axis, said rotor having a commutator and two axially opposed ends;
a first end shield being pot-shaped and having an end face connected to a cylindrical portion;
a second end shield being pot-shaped and having an external annular face, each of said end shields having a bearing for rotatably supporting a respective end of said rotor;
a stator having stator field windings, said stator being positioned between said end shields;
a switching ring positioned on said annular external face of said second end shield concentrically with said axis, said switching ring having brushes engageable with said commutator; said ring being rotatable through a predetermined angular range, said external annular face carrying electrically conductive switching strips connectable with said rotor for switching between clockwise and counterclockwise rotor rotation, said strips including first contact areas in a plane of said annular face and exposed so as to allow contact in an axial direction, second contact areas on said switching ring facing said annular surface and engageable with said switching strips to ensure contact with said brushes when said switching ring is mounted on said second end shield, said switching strips penetrating said annular face and being connectable at an internal side of said second end shield to connections with said stator windings, separate springs biasing the second contact areas on said switching ring axially onto flat contacts lying on said external annular face of said second end shield;
means for connecting said second end shield to said first end shield with said stator field windings retained therebetween.

20. A universal electric motor for any drive application, comprising:

a rotor rotatably supported on a shaft along a rotational axis, said rotor having a commutator, and two axially opposed ends;

a first end shield being pot-shaped and having an end face connected to a cylindrical portion, said cylindrical portion including at least one opening;

a second end shield being pot-shaped, each said end shield having a bearing for rotatably supporting a respective end of said rotor;

a stator having stator field windings, said stator being positioned between said end shields;

switching means mounted on said second end shield on a side of said second end shield away from said rotor for changing, in operating said motor, a direction of rotation of said rotor;

brushes in respective holders mounted to said switching ring for movement therewith;

an annular air conduction ring, said ring being received concentrically in said first end shield, said conduction ring including at least one radial projection receivable within said groove, retaining means for retaining said projection within said groove to anchor said ring within said first end shield;

a fan wheel mounted on said rotor shaft for rotation therewith and positioned between said air conduction ring and said first end shield;

axially oriented openings in said air conduction ring; and screws extending axially through said second end shield and being received in said conduction ring openings, thereby to clamp said stator between said first and second end shields.

21. A universal electric motor comprising:

a rotor having a commutator mounted on a shaft;

a first end shield having an end wall and a cylindrical side wall connected thereto;

a second end shield, each of said first and second end shields receiving bearings therein for rotatably supporting opposite ends of said rotor shaft;

a switching ring mounted on one of said first and second end shields and connected in a circuit with said rotor for changing the direction of rotation of said rotor in response to an angular change of said switching ring;

a stabilization plate positioned on said end wall of said first end shield and having a central recess for receiving one of said rotor bearings therein;

an air conduction ring received within and fixedly connected to said first end shield;

a fan mounted on said shaft between said stabilization plate and said conduction ring;

connecting means between said second end shield and said air conduction ring to connect together said first and second end shields;

and a stator received in axially oriented recesses in said end shields and being clamped therebetween.

22. A universal electric motor as in claim 21, further comprising pins extending from said end wall, and openings in said stabilization plate, a portion of each said pin extending respectively through one said opening, said portions being enlarged, whereby said stabilization plate is fixedly connected to said end wall, and further comprising bores in said stabilization plate and aligned openings in said end wall.

23. A universal electric motor as in claim 22, wherein said stabilization plate includes an axially extending protuberance projecting beyond said end wall of said first end shield.

24. A universal electric motor as in claim 22 wherein said air conduction ring includes a radially inwardly projecting annular shoulder, said shoulder being operable to cause an air stream to pass from said second end shield axially through said motor.

25. A universal electric motor as in claim 24, further comprising openings in said end shields permitting circulation of stator cooling air.

* * * * *